United States Patent
Sakata (10) Patent No.: US 11,201,560 B2
(45) Date of Patent: Dec. 14, 2021

(54) POWER CONVERSION DEVICE WITH INTERMEDIATE TERMINAL

(71) Applicant: Mitsubishi Electric Corporation, Tokyo (JP)

(72) Inventor: Kazuki Sakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/489,045

(22) PCT Filed: Apr. 6, 2017

(86) PCT No.: PCT/JP2017/014354
§ 371 (c)(1),
(2) Date: Aug. 27, 2019

(87) PCT Pub. No.: WO2018/185905
PCT Pub. Date: Oct. 11, 2018

(65) Prior Publication Data
US 2020/0021201 A1    Jan. 16, 2020

(51) Int. Cl.
*H02M 7/00*    (2006.01)
*H02M 3/335*    (2006.01)
*H02M 7/06*    (2006.01)

(52) U.S. Cl.
CPC ....... *H02M 7/003* (2013.01); *H02M 3/33569* (2013.01); *H02M 7/06* (2013.01)

(58) Field of Classification Search
CPC .... H02M 7/003; H02M 7/06; H02M 3/33569; H01F 27/2823; H01F 27/24; H01F 27/06; H01F 27/346
See application file for complete search history.

(56) References Cited

U.S. PATENT DOCUMENTS

| | | |
|---|---|---|
| 2004/0145442 A1 | 7/2004 | Matsutani et al. |
| 2007/0047266 A1 | 3/2007 | Nakahori |

(Continued)

FOREIGN PATENT DOCUMENTS

| | | |
|---|---|---|
| CN | 1914698 A | 2/2007 |
| CN | 100341079 C | 10/2007 |

(Continued)

OTHER PUBLICATIONS

Communication dated Mar. 13, 2020 from the European Patent Office in application No. 17904816.0.

(Continued)

*Primary Examiner* — Kyle J Moody
*Assistant Examiner* — Jye-June Lee
(74) *Attorney, Agent, or Firm* — Sughrue Mion, PLLC; Richard C. Turner (57) ABSTRACT

The power conversion device in which a transformer, a first rectifier element, a second rectifier element, a smoothing coil, and a smoothing capacitor are placed on a base, the transformer including a secondary winding including a first secondary winding and a second secondary winding, and an intermediate terminal at which to connect the secondary winding and the base, the smoothing coil including a smoothing coil first terminal and a smoothing coil second terminal, the smoothing capacitor being connected to the smoothing coil second terminal and the intermediate terminal, another end side of the first secondary winding and another end side of the second secondary winding being connected to each other at a connection portion, the connection portion being located between the first terminal and the second terminal, and the first terminal or the second terminal being located between the intermediate terminal and the connection portion.

8 Claims, 8 Drawing Sheets

(56) References Cited

U.S. PATENT DOCUMENTS

| | | | |
|---|---|---|---|
| 2007/0171023 A1 | 7/2007 | Ikezawa | |
| 2010/0164670 A1* | 7/2010 | Nakahori | ............... H05K 1/165 |
| | | | 336/200 |

FOREIGN PATENT DOCUMENTS

| | | | |
|---|---|---|---|
| EP | 1760867 A2 | | 3/2007 |
| EP | 1981158 A2 | | 10/2008 |
| JP | 2000-014150 A | | 1/2000 |
| JP | 2000014150 A | * | 1/2000 |
| JP | 2006332470 A | * | 12/2006 |
| JP | 2009135320 A | | 6/2009 |
| JP | 2011-062079 A | | 3/2011 |
| JP | 5434757 B2 | | 3/2014 |
| JP | 5715991 B2 | | 5/2015 |
| JP | 5933673 B1 | | 6/2016 |

OTHER PUBLICATIONS

International Search Report of PCT/JP2017/014354 dated May 30, 2017.

Communication dated Oct. 26, 2020, from The State Intellectual Property Office of the P.R. of China in Application No. 201780088900.8.

2nd Examination Opinion Notice dated May 6, 2021 from the China National Intellectual Property Administration in CN Application No. 201780088900.8.

* cited by examiner

POWER CONVERSION DEVICE WITH INTERMEDIATE TERMINAL

CROSS REFERENCE TO RELATED APPLICATIONS

This application is a National Stage of International Application No. PCT/JP2017/014354 filed Apr. 6, 2017.

TECHNICAL FIELD

The present invention relates to the structure of a power conversion device for use in, for example, electric vehicles, plug-in hybrid vehicles, or trains.

BACKGROUND ART

One known power conversion device is a DC/DC converter equipped with a transformer, a rectifier element, a smoothing coil, and a smoothing capacitor. In this device, the rectifier element is connected to a secondary winding of the transformer, and the smoothing coil and the smoothing capacitor are provided to smoothen an output voltage. A typical circuit example of the DC/DC converter includes a configuration in which a MOSFET, a smoothing coil, and a smoothing capacitor are used to form a choke input LC filter (see Patent Literature 1, for example).

In order to sufficiently exert function of the LC filter to smoothen an output of the device, it is important to reduce an impedance in a path from a connection portion between the smoothing coil and the smoothing capacitor via the smoothing capacitor to a ground portion corresponding to an intermediate terminal of the transformer, at which the smoothing capacitor and the transformer are grounded, so as to promote charging/discharging of the smoothing capacitor. As one approach to reducing impedance in the path from the smoothing coil to the intermediate terminal of the transformer, the path may be made shorter.

CITATION LIST

Patent Literature

[PTL 1] JP 5933673 B1

SUMMARY OF INVENTION

Technical Problem

However, in the related-art power conversion device, a terminal of the secondary winding, to which the rectifier element is connected, is arranged between the smoothing coil and a connection portion at which to connect the intermediate terminal and a base member. Hence, it is difficult to shorten the path between the smoothing coil and the connection portion at which to connect the intermediate terminal and the base member.

The present invention has been made with a view to solving the above-mentioned problem, and the present invention provides a power conversion device having a high output smoothing property that is obtained by shortening a path from a connection portion between a smoothing coil and a smoothing capacitor via the smoothing capacitor to a ground portion corresponding to an intermediate terminal of the transfer, at which the smoothing capacitor and the transformer are grounded.

Solution to Problem

According to one embodiment of the present invention, there is provided a power conversion device including, on a base: a transformer; a first rectifier element; a second rectifier element; a smoothing coil; and a smoothing capacitor, the transformer including a secondary winding including a first secondary winding and a second secondary winding, and an intermediate terminal at which to connect the secondary winding and the base, the smoothing coil including a smoothing coil first terminal and a smoothing coil second terminal, the first rectifier element being connected to a first terminal formed at one end side of the first secondary winding and to the smoothing coil first terminal, the second rectifier element being connected to a second terminal formed at one end side of the second secondary winding and to the smoothing coil first terminal, the smoothing capacitor being connected to the smoothing coil second terminal and the intermediate terminal, another end side of the first secondary winding and another end side of the second secondary winding being connected to each other at a connection portion, the connection portion being located between the first terminal and the second terminal, and the first terminal or the second terminal being located between the intermediate terminal and the connection portion.

Advantageous Effects of Invention

According to one embodiment of the present invention, it is possible to provide a power conversion device having a high output smoothing property that is obtained by shortening a path from the smoothing coil to the intermediate terminal of the transformer.

DESCRIPTION OF EMBODIMENTS

Now, with reference to the drawings, a power conversion device according to exemplary embodiments of the present invention is described.

First Embodiment

Figure 1:
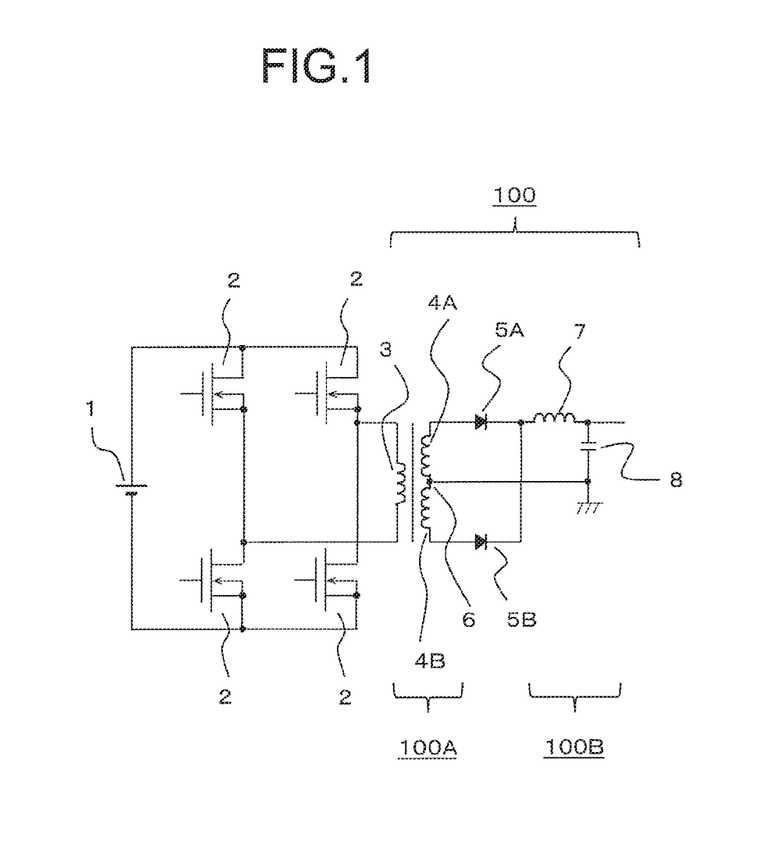
FIG. 1 is a circuit diagram for illustrating a DC/DC converter equipped with a power conversion device according to a first embodiment of the present invention.
Figure 2:
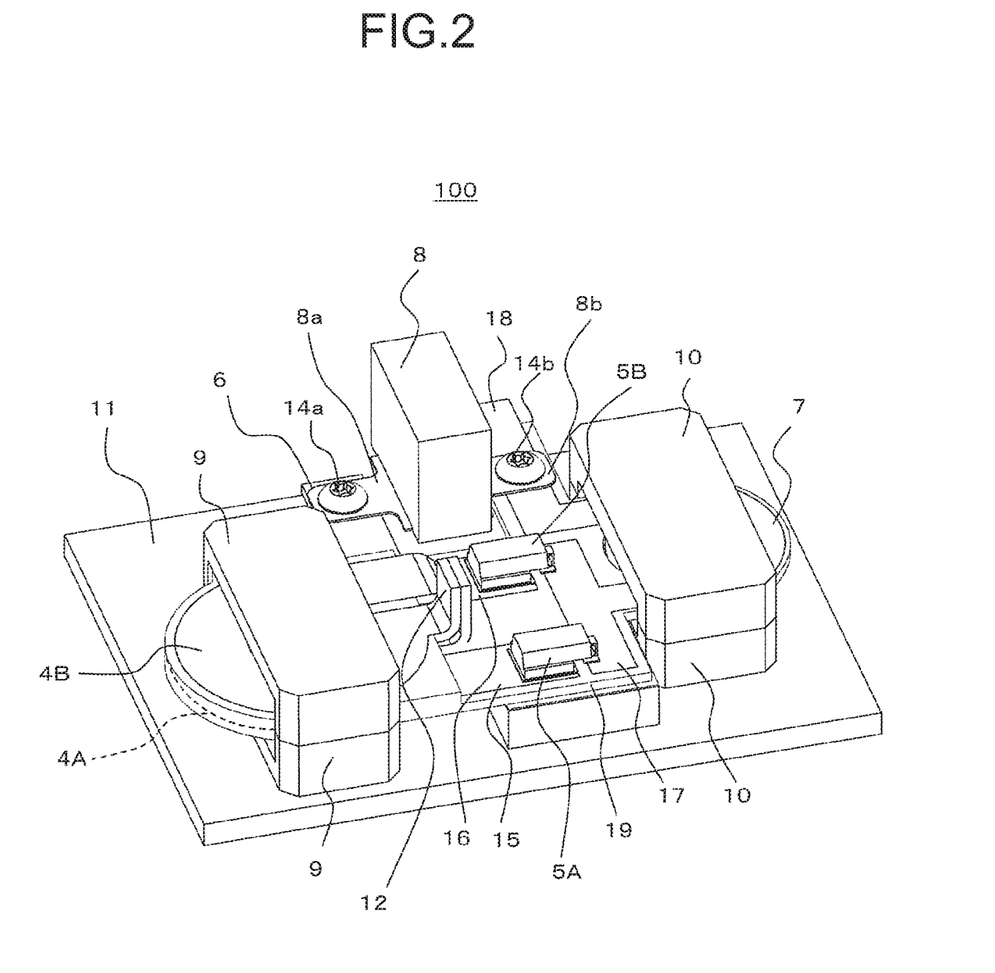
FIG. 2 is a perspective view for illustrating the power conversion device according to the first embodiment of the present invention.
Figure 3:
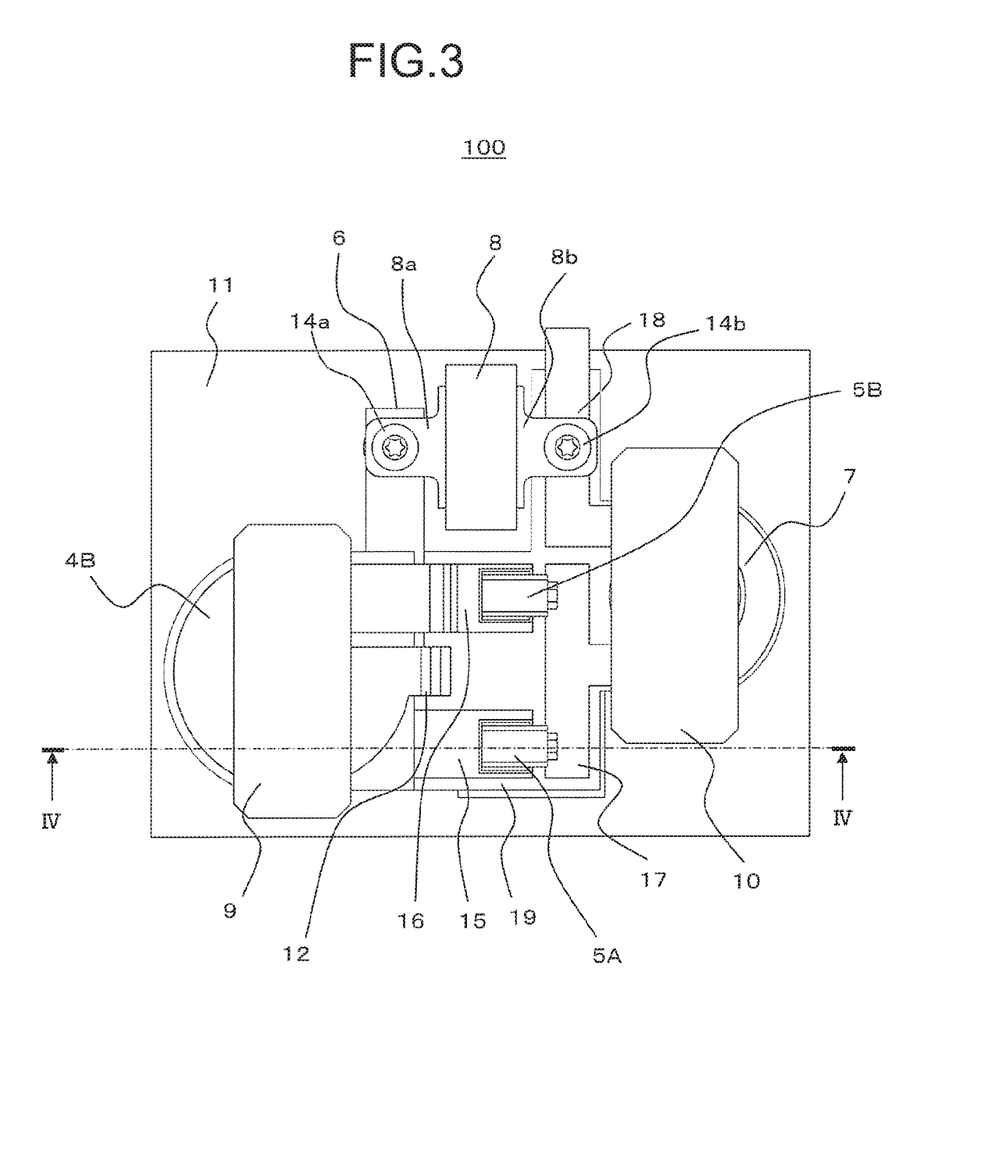
FIG. 3 is a plan view for illustrating the power conversion device according to the first embodiment of the present invention.
Figure 4:
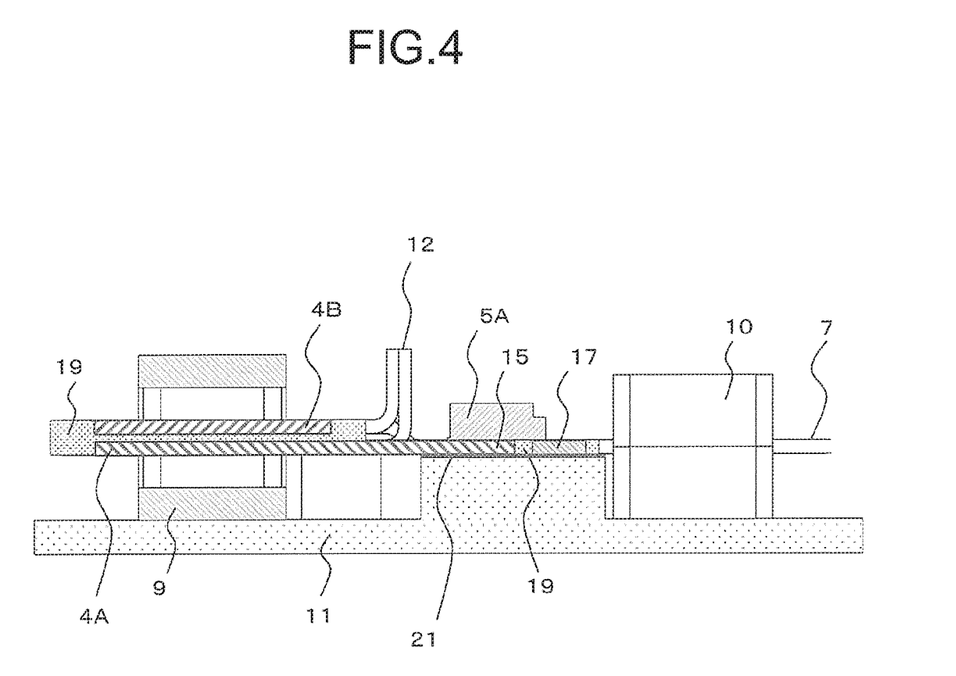
FIG. 4 is a sectional view of the power conversion device taken along the line IV-IV of FIG. 3.
Figure 5:
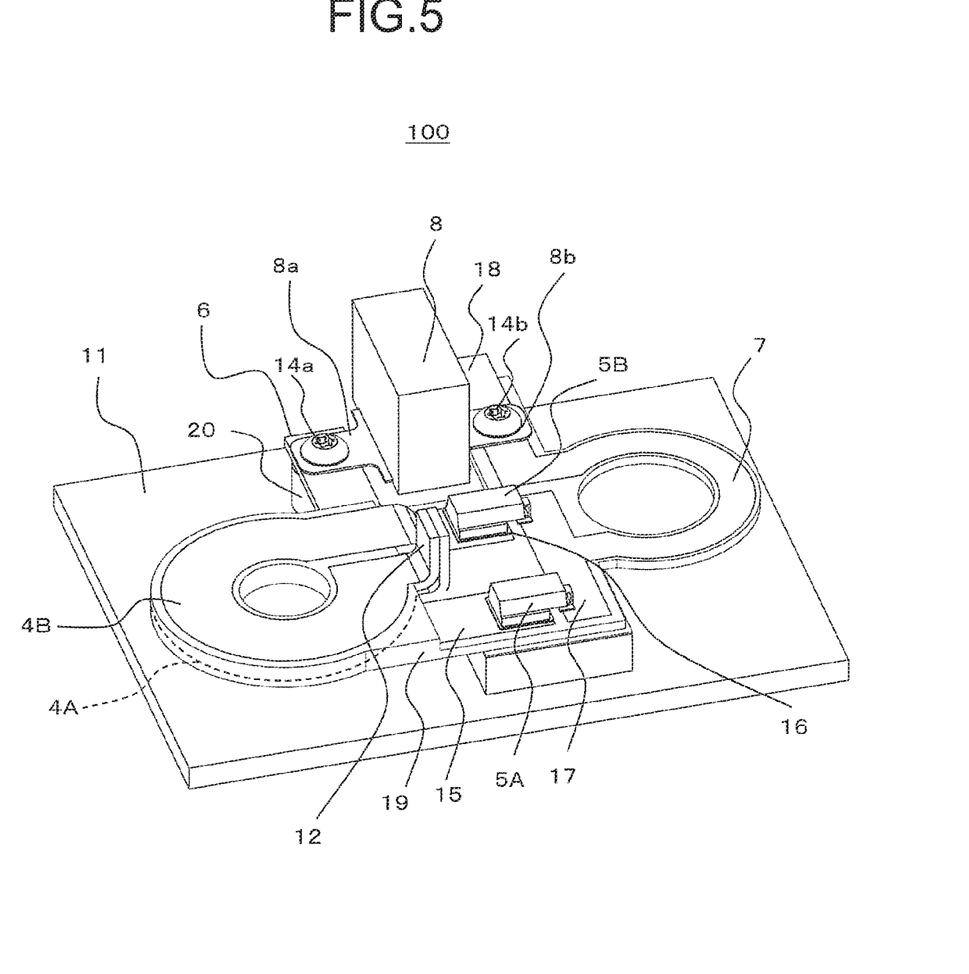
FIG. 5 is a view for illustrating the power conversion device of FIG. 2, from which transformer cores are removed.
Figure 6:
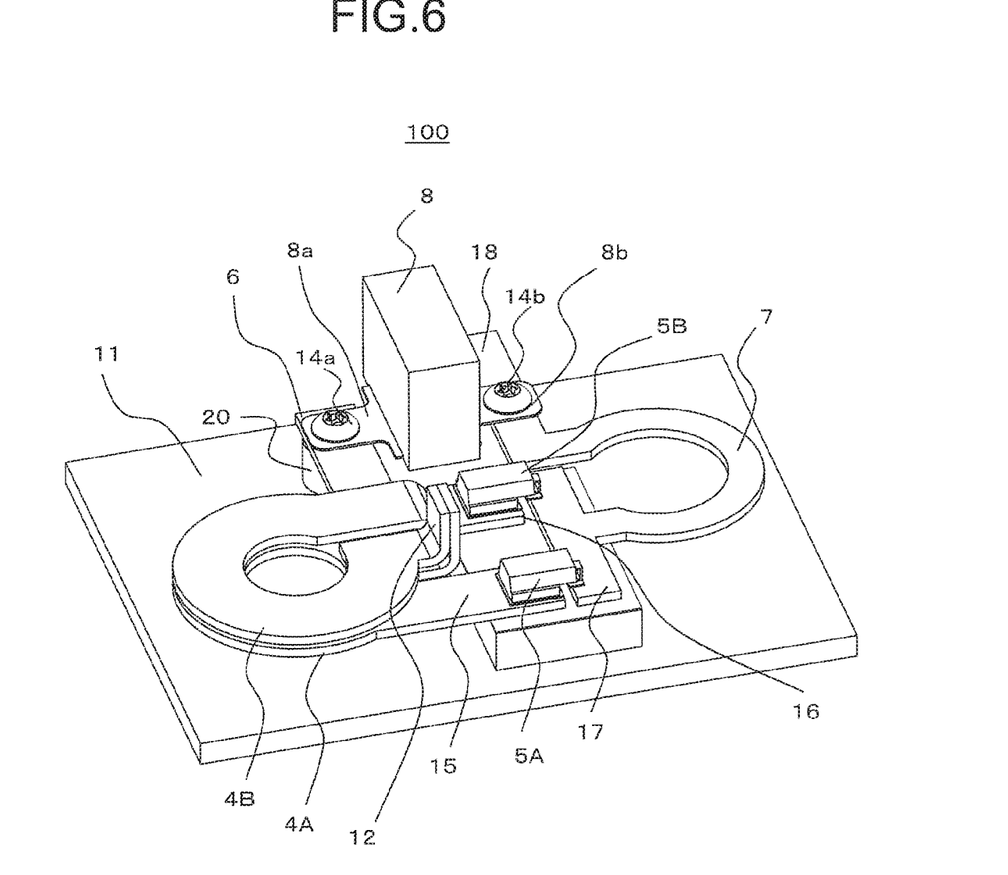
FIG. 6 is a view for illustrating the power conversion device of FIG. 5, from which a resin portion is removed.
Figure 7:
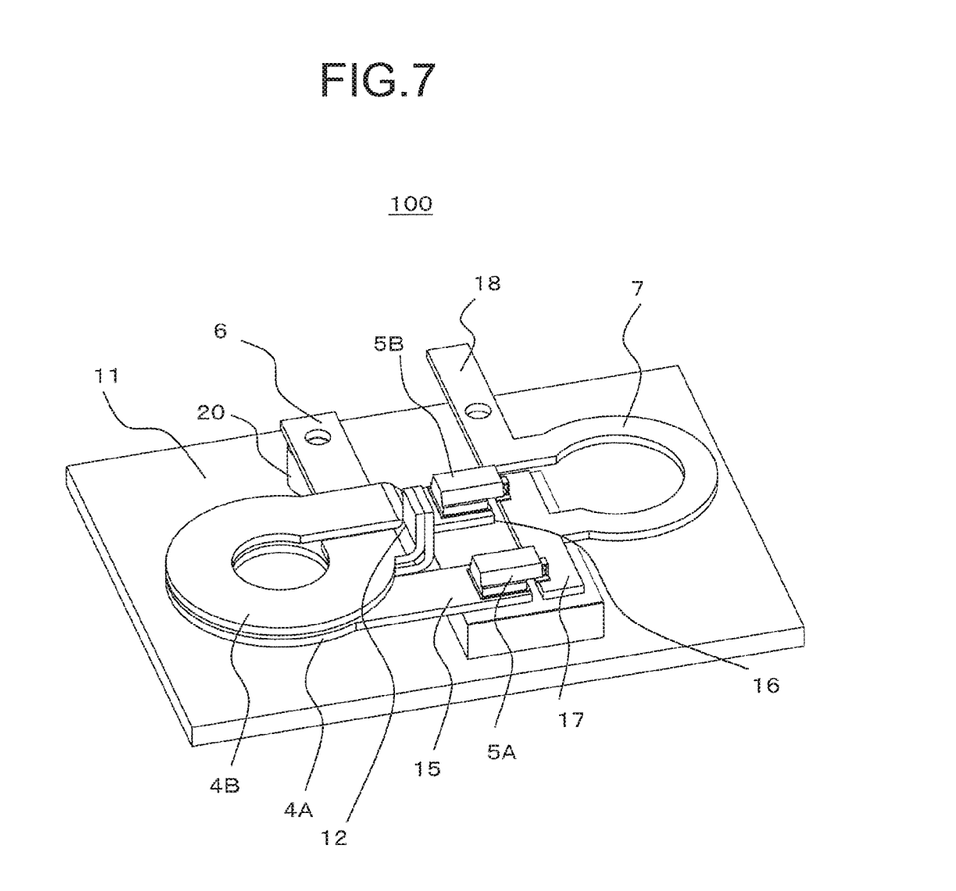
FIG. 7 is a view for illustrating the power conversion device of FIG. 6, from which a smoothing capacitor and a screw are removed.

FIG. 1 is a circuit diagram for illustrating a DC/DC converter for use in electrically powered vehicles such as an electric vehicle, a plug-in hybrid vehicle, or a train. The DC/DC converter is equipped with a power conversion device according to a first embodiment of the present invention. FIG. 2 is a perspective view for illustrating the power conversion device of the first embodiment. FIG. 3 is a plan view for illustrating the power conversion device of the first embodiment. FIG. 4 is a sectional view of the power conversion device taken along the line IV-IV of FIG. 3. FIG. 5 is a view for illustrating the power conversion device of FIG. 2, from which transformer cores and smoothing coil cores are removed. FIG. 6 is a view for illustrating the power conversion device of FIG. 5, from which a resin portion is removed. FIG. 7 is a view for illustrating the power conversion device of FIG. 6, from which a smoothing capacitor and a screw are removed.

As illustrated in FIG. 1, the DC/DC converter includes a DC power supply 1, a plurality of MOSFETs 2, and a power conversion device 100. The power conversion device 100 includes a transformer 100A including a primary winding 3, a first secondary winding 4A and a second secondary winding 4B, a pair of diodes 5A and 5B forming a rectifier circuit, and a choke input LC filter 100B including a smoothing coil 7 and a smoothing capacitor 8.

The DC power supply 1, which is mounted on an electrically powered vehicle, supplies high-voltage power to a switching circuit configured by the plurality of MOSFETs 2 to generate an AC voltage. The generated AC voltage is applied to the primary winding 3 of the transformer 100A. The transformer 100A steps down the voltage in accordance with a turn ratio. The stepped-down voltage is applied to the first secondary winding 4A and the second secondary winding 4B of the transformer 100A, and then converted by the diodes 5A and 5B into a DC current including a pulsating current. After that, the pulsating current is removed by a smoothing circuit including the smoothing coil 7 and the smoothing capacitor 8, and the resultant current is then supplied to an in-vehicle lead battery and an in-vehicle auxiliary battery device via an output terminal (not illustrated).

As illustrated in FIG. 2, the power conversion device 100 of the first embodiment includes, on a base 11, the transformer 100A including the first secondary winding 4A and the second secondary winding 4B that are covered by a pair of transformer cores 9. The power conversion device 100 further includes the pair of diodes 5A and 5B as rectifier elements, the smoothing coil 7 covered with a pair of smoothing coil cores 10, and the smoothing capacitor 8. Note that, the primary winding 3 as a part of the transformer 100A is not illustrated.

As illustrated in FIG. 2 to FIG. 5, the secondary winding of the transformer 100A is formed such that the second secondary winding 4B is placed on the first secondary winding 4A with a certain space therefrom, and is integrally molded through use of a resin 19. The resultant one is covered by the pair of transformer cores 9 from above and below.

On a first terminal 15 formed at one end side of the first secondary winding 4A, an anode of the diode 5A is surface-mounted by soldering. Meanwhile, on a second terminal 16 formed at one end side of the second secondary winding 4B, an anode of the diode 5B is surface-mounted by soldering. Another end side of the first secondary winding 4A and another end side of the second secondary winding 4B are welded to form a connection portion 12.

The first secondary winding 4A, the second secondary winding 4B, and the smoothing coil 7 are integrally molded through use of the resin 19. The first terminal 15 of the first secondary winding 4A, the second terminal 16 of the second secondary winding 4B, and a smoothing coil first terminal 17 are each exposed from the resin 19.

Further, as illustrated in FIG. 4, the first terminal 15 of the first secondary winding 4A, the second terminal 16 of the second secondary winding 4B, and the smoothing coil first terminal 17 are brought into contact with the base 11 through an insulating sheet 21, at their surfaces on which the diodes 5A and 5B are not mounted. With this arrangement, heat generated by the diodes 5A and 5B is transferred to the base 11 to be released.

The connection portion 12 between the first secondary winding 4A and the second secondary winding 4B is located between the first terminal 15 and the second terminal 16. Further, cathodes of the diodes 5A and 5B are surface-mounted by soldering to the smoothing coil first terminal 17.

As illustrated in FIG. 6 and FIG. 7, an intermediate terminal 6 is formed so as to extend from the first secondary winding 4A. The intermediate terminal 6 is provided opposite to the connection portion 12 across the second terminal 16. Further, the intermediate terminal 6 is connected to a boss 20 formed on the base 11 by means of a screw 14a, together with one terminal 8a of the smoothing capacitor 8. Another terminal 8b of the smoothing capacitor 8 is connected to a smoothing coil second terminal 18 by means of a screw 14b.

As described above, according to the power conversion device 100 of the first embodiment, the one terminal 8a of the smoothing capacitor 8 is directly connected to the intermediate terminal 6 extending from the first secondary winding 4A, and the another terminal 8b thereof is directly connected to the smoothing coil second terminal 18. This structure allows shortening of a path from the smoothing coil second terminal 18 via the smoothing capacitor 8 to the intermediate terminal 6. It is accordingly possible to reduce an impedance in the path and allow the LC filter 100B to sufficiently exert its functions, so as to achieve the power conversion device 100 having a high output smoothing property.

Second Embodiment

Figure 8:
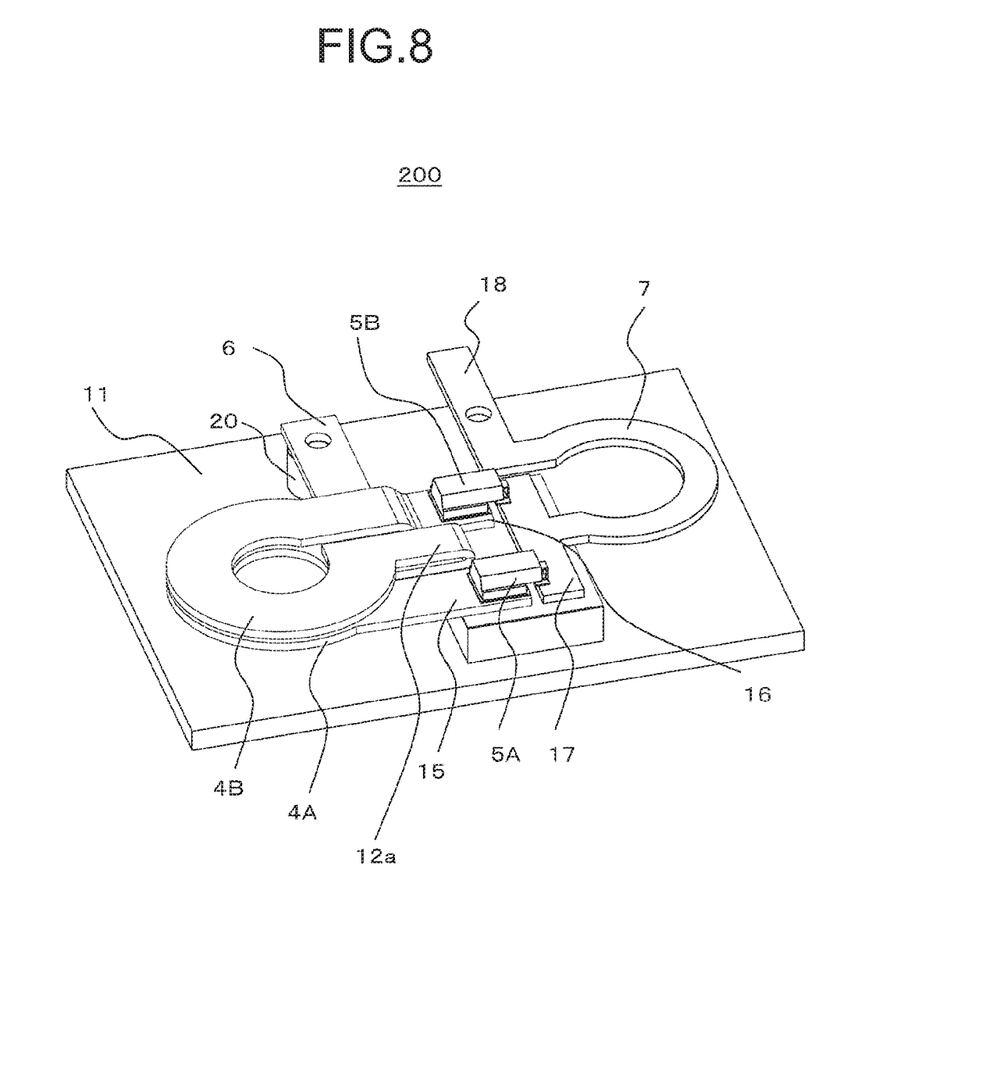
FIG. 8 is a view for illustrating a base, a secondary winding, rectifier elements, and a smoothing coil in a power conversion device according to a second embodiment of the present invention.

FIG. 8 is a perspective view for illustrating a power conversion device 200 according to a second embodiment of the present invention, in which only the base 11, the first secondary winding 4A, the second secondary winding 4B, the smoothing coil 7, and the diodes 5A and 5B are illustrated. The power conversion device 200 of the second embodiment differs from the first embodiment in terms of a connection form of the first secondary winding 4A and the second secondary winding 4B. Other components are the same as those of the first embodiment.

As illustrated in FIG. 8, the first secondary winding 4A and the second secondary winding 4B of the power conversion device 200 are integrally produced by bending a single metal sheet at a portion corresponding to a bent portion 12a.

Consequently, according to the power conversion device 200 of the second embodiment, a process for welding the first secondary winding 4A and the second secondary winding 4B can be omitted. Further, the LC filter 100B can sufficiently exert its functions in the thus-simplified structure, so as to achieve the power conversion device 200 having a high output smoothing property.

REFERENCE SIGNS LIST

1 DC power supply, 2 MOSFET, 3 primary winding, 4A first secondary winding, 4B second secondary winding, 5A diode (first rectifier element), 5B diode (second rectifier element), 6 intermediate terminal, 7 smoothing coil, 8 smoothing capacitor, 8a, 8b terminal, 9 transformer core, 10 smoothing coil core, 11 base, 12 connection portion, 12a bent portion, 14a, 14b screw (fastening member), 15 first terminal, 16 second terminal, 17 smoothing coil first terminal, 18 smoothing coil second terminal, 19 resin, 20 boss, 21 insulating sheet, 100, 200 power conversion device, 100A transformer, 100B LC filter

The invention claimed is:

1. A power conversion device comprising, on a base:
a transformer;
a first rectifier element;
a second rectifier element;
a smoothing coil; and
a smoothing capacitor,
the transformer including a secondary winding including a first secondary winding and a second secondary winding, and an intermediate terminal where the secondary winding is connected to the base,
the smoothing coil including a smoothing coil first terminal and a smoothing coil second terminal,
the first rectifier element being connected to a first terminal formed at one end side of the first secondary winding, and to the smoothing coil first terminal,
the second rectifier element being connected to a second terminal formed at one end side of the second secondary winding, and to the smoothing coil first terminal,
the smoothing capacitor being connected to the smoothing coil second terminal, and to the intermediate terminal,
another end side of the first secondary winding and another end side of the second secondary winding being connected to each other at a connection portion,
the connection portion being located between the first terminal and the second terminal, and
the first terminal or the second terminal being located between the intermediate terminal and the connection portion,
wherein an insulating sheet is arranged between each of the base and the first terminal, the base and the second terminal, and the base and the smoothing coil first terminal,
wherein the first rectifier element is surface-mounted by soldering to the first terminal and the smoothing coil first terminal,
wherein the second rectifier element is surface-mounted by soldering to the second terminal and the smoothing coil first terminal, and
wherein the first terminal, the second terminal, and the smoothing coil first terminal are brought into contact with the base through the insulating sheet, at their surfaces on which the first rectifier element and the second rectifier element are not mounted.

2. The power conversion device according to claim 1, wherein at least one of the first secondary winding or the second secondary winding is formed integrally with the intermediate terminal.

3. The power conversion device according to claim 1, wherein the first secondary winding and the second secondary winding are formed integrally by bending a single plate-like member.

4. The power conversion device according to claim 1, wherein the intermediate terminal and a terminal of the smoothing capacitor are directly connected to each other.

5. The power conversion device according to claim 4, wherein the intermediate terminal and the terminal of the smoothing capacitor are joined together to the base by a fastening member.

6. The power conversion device according to claim 1, wherein the secondary winding and the smoothing coil are integrally formed by insert molding through use of a resin.

7. The power conversion device according to claim 6, wherein the secondary winding and the smoothing coil are integrally formed by the insert molding, under a state in which the first terminal, the second terminal, the smoothing coil first terminal, and the smoothing coil second terminal are exposed.

8. The power conversion device according to claim 1, wherein the smoothing coil is disposed on an opposite side of a virtual line extending in the first direction through smoothing capacitor from the transformer.

* * * * *